United States Patent
Okuda et al.

(10) Patent No.: US 8,016,928 B2
(45) Date of Patent: *Sep. 13, 2011

(54) WATER-BASED INK FOR INK-JET RECORDING, INK CARTRIDGE AND INK-JET RECORDING APPARATUS

(75) Inventors: Satoshi Okuda, Kiyosu (JP); Akihiko Taniguchi, Kakamigahara (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 313 days.

This patent is subject to a terminal disclaimer.

(21) Appl. No.: 12/342,712

(22) Filed: Dec. 23, 2008

(65) Prior Publication Data

US 2009/0165671 A1    Jul. 2, 2009

(30) Foreign Application Priority Data

Dec. 28, 2007    (JP) .................................. 2007-338538

(51) Int. Cl.
C09D 11/02    (2006.01)
B41J 2/01    (2006.01)

(52) U.S. Cl. ............... 106/31.48; 106/31.58; 106/31.59; 347/100

(58) Field of Classification Search .............. 106/31.48, 106/31.58, 31.59; 347/100
See application file for complete search history.

(56) References Cited

U.S. PATENT DOCUMENTS
5,952,414 A    9/1999    Noguchi et al.
(Continued)

FOREIGN PATENT DOCUMENTS
JP    09-111165    4/1997
(Continued)

*Primary Examiner* — Helene Klemanski
(74) *Attorney, Agent, or Firm* — Banner & Witcoff, Ltd.

(57) ABSTRACT

A water-based ink for ink-jet recording includes a dye represented by the general formula (1); water; dipropylene glycol propyl ether (DPP); and a surfactant represented by the general formula (2). The dye, DPP, and the surfactant are blended so as to satisfy the conditions (A) and (B).
(A) an amount of surfactant represented by general formula (2) relative to a total amount of the ink is in the range of about 0.5 wt % to about 2.5 wt %
(B) an amount of DPP relative to a total amount of the ink is in the range of about 1 wt % to about 3 wt %.

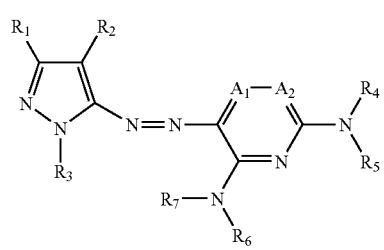

(1)

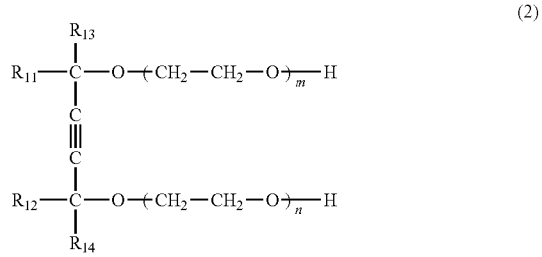

(2)

7 Claims, 2 Drawing Sheets

U.S. PATENT DOCUMENTS

| | | |
|---|---|---|
| 7,108,743 B2 | 9/2006 | Fujiwara et al. |
| 7,109,336 B2 | 9/2006 | Fujiwara et al. |
| 7,201,477 B2 | 4/2007 | Taguchi et al. |
| 7,465,345 B2 * | 12/2008 | Okuda et al. ............... 106/31.28 |
| 7,713,343 B2 * | 5/2010 | Goto et al. ................. 106/31.48 |
| 7,727,321 B2 * | 6/2010 | Goto et al. ................. 106/31.48 |
| 7,736,424 B2 * | 6/2010 | Hamajima et al. ......... 106/31.48 |
| 7,736,425 B2 * | 6/2010 | Kato et al. ................. 106/31.48 |
| 2006/0009357 A1 | 1/2006 | Fujiwara et al. |
| 2007/0173641 A1 | 7/2007 | Fujiwara et al. |
| 2007/0186806 A1* | 8/2007 | Goto et al. ................. 106/31.48 |
| 2007/0186807 A1 | 8/2007 | Goto et al. |
| 2007/0188573 A1* | 8/2007 | Hamajima et al. ......... 106/31.48 |
| 2007/0188574 A1* | 8/2007 | Kato et al. ................. 106/31.48 |
| 2008/0302270 A1* | 12/2008 | Taniguchi et al. ......... 106/31.45 |
| 2009/0165673 A1* | 7/2009 | Taniguchi et al. ......... 106/31.48 |
| 2009/0167831 A1 | 7/2009 | Okuda et al. |

FOREIGN PATENT DOCUMENTS

| | | |
|---|---|---|
| JP | 2002371079 | 12/2002 |
| JP | 2002371214 | 12/2002 |
| JP | 2003231823 | 8/2003 |
| JP | 2006143989 | 6/2006 |
| JP | 2007217523 | 8/2007 |
| JP | 2009155602 A | 7/2009 |
| JP | 2009155605 A | 7/2009 |

* cited by examiner

WATER-BASED INK FOR INK-JET RECORDING, INK CARTRIDGE AND INK-JET RECORDING APPARATUS

CROSS-REFERENCE TO RELATED APPLICATION

This application claims priority from Japanese Patent Application No. 2007-338538 filed on Dec. 28, 2007. The entire subject matter of the Japanese Patent Application is incorporated herein by reference.

BACKGROUND

Conventionally, as an ink for ink-jet recording, an ink is known that comprises a dye, dipropylene glycol propyl ether, an acetylene glycol surfactant, and the like. The ink is required to be (i) good in ejection stability in prolonged use, (ii) good in printing quality, (iii) preventing compound derived from material that forms an ink-jet recording apparatus from being eluted into the ink, and (iv) good in toughness such as light resistance and ozone resistance of recording material. However, there were no conventional inks that satisfy all of the aforementioned performances. Examples of the material that forms the ink-jet recording apparatus include a rubber member and an organic material member other than rubber material. Examples of the rubber member include a wiper and a cap. The wiper wipes a nozzle surface of an ink-jet head, for example. The cap blocks off the nozzle surface from the outside world, for example. When a compound derived from the rubber member is eluted into the ink, there is a possibility that the compound is deposited in the ink. When the compound is deposited, for example, a nozzle of the ink-jet head may be clogged.

SUMMARY

A water-based ink for ink-jet recording comprises a coloring agent, water, a water-soluble organic solvent, and an acetylene glycol surfactant. The coloring agent comprises a dye represented by the following general formula (1), the water-soluble organic solvent comprises dipropylene glycol propyl ether, and the acetylene glycol surfactant comprises a surfactant represented by the following general formula (2). The dipropylene glycol propyl ether and the surfactant represented by the following general formula (2) are blended so as to satisfy the following conditions (A) and (B), respectively.

(A) an amount of surfactant represented by general formula (2) relative to a total amount of the ink in the range of about 0.5 wt % to about 2.5 wt %

(B) an amount of dipropylene glycol propyl ether relative to a total amount of the ink is in the range of about 1 wt % to about 3 wt %

(1)

wherein in the general formula (1),

$R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$ and $R_7$, each independently, represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, provided that $R_4$, $R_5$, $R_6$, and $R_7$ may be the same or different, that $R_4$ and $R_5$ are not simultaneously hydrogen atoms, and that $R_6$ and $R_7$ are not simultaneously hydrogen atoms; and $A_1$ and $A_2$ are both substituted or unsubstituted carbon atoms, or one of $A_1$ and $A_2$ is a substituted or unsubstituted carbon atom and the other is a nitrogen atom.

(2)

wherein in the general formula (2), m and n may be the same or different and indicate numbers that satisfy m+n=1 to 15; and $R_{11}$, $R_{12}$, $R_{13}$, and $R_{14}$ may be the same or different and are straight chain or branched-chain alkyl groups having 1 to 5 carbon atoms.

An ink cartridge comprises the water-based ink for inkjet recording.

An ink-jet recording apparatus comprises the ink cartridge and an ink ejection unit. The water-based ink for inkjet recording comprised in the ink cartridge is ejected from the ink ejection unit.

DETAILED DESCRIPTION

With respect to the water-based ink for ink-jet recording, further, the dipropylene glycol propyl ether and the surfactant represented by the general formula (2) may be blended so as to satisfy the following condition (C), respectively.

(C) $y \geq -2x+3$ and $y \leq -2x+6$ x: an amount of surfactant represented by general formula (2) relative to the total amount of the ink (wt %)

y: an amount of dipropylene glycol propyl ether relative to the total amount of the ink (wt %)

The x and y may strictly satisfy the condition (C) or may be placed at neighborhood of the straight line of y=−2x+3 in y<−2x+3 and the straight line of y=−2x+6 in y>−2x+6.

With respect to the water-based ink for ink-jet recording, an amount of the dye represented by the general formula (1) relative to the total amount of ink is in the range of about 2 wt % to about 4.5 wt %.

Application of the water-based ink for ink-jet recording is not particularly limited and, for example, may be used as a water-based magenta ink. The water-based ink for ink-jet recording may be used as a water-based ink other than a magenta color by further comprising coloring agents other than the dye represented by the general formula (1).

Next, the water-based ink for ink-jet recording (hereinafter, also may be referred to as "water-based ink" or "ink") is explained. The water-based ink for ink-jet recording comprises a coloring agent, water, a water-soluble organic solvent, and an acetylene glycol surfactant. As described above, the coloring agent comprises the dye represented by the general formula (1).

As has been described, in the general formula (1), $R_1$ represents a hydrogen atom, a substituted or unsubstituted alkyl group, or a substituted or unsubstituted aryl group; $R_2$ represents a hydrogen atom, a halogen atom, or a cyano group; $R_3$ represents a hydrogen atom, a substituted or unsubstituted alkyl group, a substituted or unsubstituted aryl group, or a substituted or unsubstituted heterocyclic group; $R_4$, $R_5$, $R_6$ and $R_7$, each independently, represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, provided that $R_4$, $R_5$, $R_6$, and $R_7$ may be the same or different, and that $R_4$ and $R_5$ are not simultaneously hydrogen atoms and that $R_6$ and $R_7$ are not simultaneously hydrogen atoms; and $A_1$ and $A_2$ are both substituted or unsubstituted carbon atoms, or one of $A_1$ and $A_2$ is a substituted or unsubstituted carbon atom and the other is a nitrogen atom.

In the general formula (1), the substituted or unsubstituted alkyl group may be an alkyl group having 1 to 6 carbon atoms. Examples of the substituted or unsubstituted alkyl group include a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and the like. Examples of the substituent of the substituted alkyl group include a hydroxyl group; an alkoxy group such as a methoxy group, an ethoxy group and the like; a cyano group; a halogen atom such as a fluorine atom, a chlorine atom, a bromine atom, an iodine atom and the like; an ionic hydrophilic group such as a carboxylate, a sulfonate and the like.

In the general formula (1), the substituted or unsubstituted aryl group may be an aryl group having 6 to 12 carbon atoms. However, in the case of the substituted aryl group, the number of carbon atom does not include the number of carbon atom of the substituent. Examples of the substituted or unsubstituted aryl group include a phenyl group, a naphthyl group, a p-tolyl group, a p-octylphenyl group, a mesityl group, a p-methoxyphenyl group, an o-chlorophenyl group, an m-(3-sulfopropylamino)phenyl group and the like. Examples of the substituent of the substituted aryl group include an alkyl group such as a methyl group, an ethyl group, an isopropyl group, a tert-butyl group, an n-octyl group and the like; an alkoxy group (see above); a halogen atom (see above); an alkylamino group such as a methylamino group, a dimethylamino group and the like; an amide group; a carbamoyl group; a sulfamoyl group; a sulfoamide group; a hydroxyl group; an ester group such as a methoxycarbonyl group, an ethoxycarbonyl group and the like; and an ionic hydrophilic group (see above).

In the general formula (1), examples of the halogen atom include a fluorine atom, a chlorine atom, a bromine atom, an iodine atom and the like.

In the general formula (1), the substituted or unsubstituted heterocyclic group may be a heterocyclic group having a 5-ring or 6-ring. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group and the like. Examples of the substituent of the substituted heterocyclic group include an amide group, a carbamoyl group, a sulfamoyl group, a sulfoamide group, a hydroxyl group, an ester group (see above), an ionic hydrophilic group (see above) and the like.

In the general formula (1), examples of the substituted or unsubstituted sulfonyl group include a methylsulfonyl group, a phenylsulfonyl group and the like. Examples of the substituent of a substituted sulfonyl group include the substituted or unsubstituted alkyl group (see above), a substituted or unsubstituted aryl group (see above) and the like.

In the general formula (1), the substituted or unsubstituted acyl group may be an acyl group having 1 to 12 carbon atoms. However, in the case of the substituted acyl group, the number of carbon atom does not include the number of carbon atom of the substituent. Examples of the substituted or unsubstituted acyl group include an acetyl group, a benzoyl group, a chloroacetyl group and the like. Examples of the substituent of the substituted acyl group include an ionic hydrophilic group (see above) and the like.

As has been described, in the general formula (1), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ may be both substituted or unsubstituted carbon atoms because better performance may be obtained. Examples of the substituent bonded to the carbon atoms $A_1$ and $A_2$ include an alkyl group having 1 to 3 carbon atoms, a carboxyl group, a carbamoyl group, a cyano group and the like.

As has been described, in the general formula (1), $R_4$ and $R_5$ are not simultaneously hydrogen atoms, and also $R_6$ and $R_7$ are not simultaneously hydrogen atoms. Moreover, in the general formula (1), when the number of substituents of sulfonic acid group or carboxyl group is large, the water solubility of the dye represented by the general formula (1) tends to be improved. Therefore, the number of these substituents may be adjusted in accordance with need.

One embodiment of the dye represented by the general formula (1) is, in the general formula (1), in a state where $R_1$ is an alkyl group; $R_2$ is a cyano group; $R_3$ is a hydrogen atom, or a substituted or unsubstituted heterocyclic group; $R_4$ is a hydrogen atom, a substituted or unsubstituted heterocyclic group, or a substituted aryl group; $R_5$ and $R_6$ are, each independently, a substituted heterocyclic group, or a substituted aryl group; $R_7$ is a hydrogen atom; $A_1$ is a substituted carbon atom; and $A_2$ is a substituted or unsubstituted carbon atom.

A further embodiment of the dye represented by the general formula (1) is, in the general formula (1), in a state where $R_1$ is a tert-butyl group; $R_2$ is a cyano group; $R_3$ is a hydrogen atom, or a benzothiazolyl group optionally substituted by a sulfonic acid group or an alkali metal sulfonate group (preferably a benzothiazole-2-yl group); $R_4$ is a hydrogen atom, a benzothiazolyl group optionally substituted by a sulfonic acid group or an alkali metal sulfonate group (preferably a benzothiazole-2-yl group), or a trialkylphenyl group substituted by a sulfonic acid group or an alkali metal sulfonate group

(preferably a mesityl group); $R_5$ and $R_6$ are, each independently, a monoalkylphenyl group, a dialkylphenyl group, or a trialkylphenyl group optionally substituted by a sulfonic acid group or an alkali metal sulfonate group (preferably a p-octylphenyl or mesityl group), or a benzothiazolyl group substituted by a sulfonic acid group or an alkali metal sulfonate group (preferably a benzothiazole-2-yl group); $R_7$ is a hydrogen atom; $A_1$ is a carbon atom substituted by an alkyl group (preferably a methyl group); and $A_2$ is a carbon atom optionally substituted by a cyano group.

Examples of the dye represented by the general formula (1) comprise compounds represented by chemical formulae (1-A) to (1-F) below.

(1-A)

The compound represented by the chemical formula (1-A) is an embodiment of the dye represented by the general formula (1), wherein, in the general formula (1), $R_1$ is a tert-butyl group; $R_2$ is a cyano group; $R_3$ is a benzothiazole-2-yl group; $R_4$ is a hydrogen atom; $R_5$ and $R_6$ are each a p-octylphenyl group; $R_7$ is a hydrogen atom; $A_1$ is a carbon atom substituted by a methyl group; and $A_2$ is a carbon atom substituted by a cyano group.

(1-B)

The compound represented by the chemical formula (1-B) is another embodiment of the dye represented by the general formula (1), wherein, in the general formula (1), $R_1$ is a tert-butyl group; $R_2$ is a cyano group; $R_3$ and $R_4$ are each a benzothiazole-2-yl group; $R_5$ and $R_6$ are each a mesityl group; $R_7$ is a hydrogen atom; $A_1$ is a carbon atom substituted by a methyl group; and $A_2$ is a carbon atom.

(1-C)

The compound represented by the chemical formula (1-C) is yet another embodiment of the dye represented by the general formula (1), wherein, in the general formula (1), $R_1$ is a tert-butyl group; $R_2$ is a cyano group; $R_3$ and $R_4$ are each a 6-sodium sulfonate benzothiazole-2-yl group; $R_5$ and $R_6$ are each a 3-sodium sulfonate mesityl group; $R_7$ is a hydrogen atom; $A_1$ is a carbon atom substituted by a methyl group; and $A_2$ is a carbon atom.

(1-D)

The compound represented by the chemical formula (1-D) is yet another embodiment of the dye represented by the general formula (1), wherein, in the general formula (1), $R_1$ is a tert-butyl group; $R_2$ is a cyano group; $R_3$ and $R_4$ are each a 6-lithium sulfonate benzothiazole-2-yl group; $R_5$ and $R_6$ are each a 2,6-diethyl-4-methyl-3-sulfo lithium salt phenyl group; $R_7$ is a hydrogen atom; $A_1$ is a carbon atom substituted by a methyl group; and $A_2$ is a carbon atom.

(1-E)

The compound represented by chemical formula (1-E) is yet another embodiment of the dye represented by the general formula (1), wherein, in the general formula (1), $R_1$ is a tert-butyl group; $R_2$ is a cyano group; $R_3$ and $R_4$ are each 6-potassium sulfonate benzothiazole-2-yl group; $R_5$ and $R_6$ are each a 3-potassium sulfonate mesityl group; $R_7$ is a hydrogen atom; $A_1$ is a carbon atom substituted by a methyl group; and $A_2$ is a carbon atom.

(1-F)

The compound represented by chemical formula (1-F) is yet another embodiment of the dye represented by the general formula (1), wherein, in the general formula (1), $R_1$ is a tert-butyl group; $R_2$ is a cyano group; $R_3$ and $R_4$ are each 6-lithium sulfonate benzothiazole-2-yl group; $R_5$ and $R_6$ are each a 2,6-diethyl-4-sulfo lithium salt phenyl group; $R_7$ is a hydrogen atom; $A_1$ is a carbon atom substituted by a methyl group; and $A_2$ is a carbon atom.

An amount of the dye represented by the general formula (1) is not particularly limited. Inclusion of the dye in the ink makes it possible to improve toughness such as light resistance and ozone resistance of recording material recorded using the water-based ink. The amount of the dye represented by the general formula (1) relative to the total amount of the ink is in the range of about 2 wt % to about 4.5 wt %. By setting the amount of the dye represented by the general formula (1) in the aforementioned range, water-based ink may be obtained that is good in printing quality and ejection stability.

The coloring agent may be composed of the dye represented by the general formula (1) only or may further comprise other dyes or pigments.

The water may be ion-exchange water or purified water. An amount of the water relative to the total amount of the ink is, for example, in the range of about 10 wt % to about 90 wt %, and in the range of about 40 wt % to about 80 wt %. The amount of the water may be a balance of the other components, for example.

The water-soluble organic solvent is classified into a humectant and a penetrant. The humectant prevents ink from drying at a tip of an ink-jet head, for example. The penetrant adjusts a drying rate of ink on a recording paper, for example.

The humectant is not limited. Examples of the humectant include lower alcohol such as methyl alcohol, ethyl alcohol, n-propyl alcohol, isopropyl alcohol, n-butyl alcohol, sec-butyl alcohol, tert-butyl alcohol and the like; amide such as dimethylformamide, dimethylacetamide and the like; ketone such as acetone and the like; ketoalcohol such as diacetone alcohol and the like; ether such as tetrahydrofuran, dioxane and the like; polyalcohol such as polyalkylene glycol, alkylene glycol, glycerin and the like; 2-pyrrolidone; N-methyl-2-pyrrolidone; 1,3-dimethyl-2-imidazolidinone; and the like. Examples of the polyalkylene glycol include, without limitation, polyethylene glycol, polypropylene glycol and the like. Examples of the alkylene glycol include, without limitation, ethylene glycol, propylene glycol, butylene glycol, diethylene glycol, triethylene glycol, dipropylene glycol, tripropylene glycol, thiodiglycol, hexylene glycol and the like. Among them, polyalcohol such as alkylene glycol and glycerin is preferable. One of the humectants may be used alone or two or more of them may be used in combination.

An amount of the humectant is not particularly limited. The amount of the humectant relative to the total amount of the ink is, for example, in the range of about 0 wt % to about 95 wt %, in the range of about 10 wt % to about 80 wt %, and in the range of about 10 wt % to about 50 wt %.

The water-based ink for ink-jet recording comprises dipropylene glycol propyl ether (DPP) as the penetrant. As described above, the amount of the DPP relative to the total amount of the ink is in the range of about 1 wt % to about 3 wt %, in the range of about 1.2 wt % to about 2.7 wt %.

The penetrant may be composed of the DPP only or further may comprise other penetrants as long as it does not undermine the advantage of the present invention.

The penetrant other than the DPP is not limited. Examples of the penetrant include ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol butyl ether, tripropylene glycol methyl ether, tripropylene glycol ethyl ether, tripropylene glycol propyl ether, tripropylene glycol butyl ether and the like. One of the penetrants other than the DPP may be used alone or two or more of them may be used in combination.

As described above, the water-based ink for ink-jet recording comprises an acetylene glycol surfactant. The acetylene glycol surfactant comprises the surfactant represented by the general formula (2). In the general formula (2), the m and n may be the same or different. The m and n are the numbers that satisfy m+n=1 to 15, and m+n=3 to 11. $R_{11}$, $R_{12}$, $R_{13}$, and $R_{14}$ may be the same or different, and are straight chain or branched-chain alkyl groups having 1 to 5 carbon atoms. The alkyl group includes, for example, a methyl group, an ethyl group, a propyl group, an isopropyl group, a butyl group, and the like.

The surfactant represented by the general formula (2) may be a commercially available surfactant, for example. Examples of the commercially available surfactant include OLFIN® E1010, OLFIN® E1004, SURFYNOL® 440, and SURFYNOL® 465 manufactured by Nissin Chemical Industry Co., Ltd.; and ACETYRENOL® E40 and ACETYRENOL® E100 manufactured by Kawaken Fine Chemicals Co., Ltd.

As described above, the amount of the surfactant represented by the general formula (2) relative to the total amount of the ink is in the range of about 0.5 wt % to about 2.5 wt %, in the range of about 0.6 wt % to about 2 wt %.

The water-based ink for ink-jet recording may comprise surfactant other than the surfactant that is represented by the general formula (2) as long as it does not undermine the advantage of the present invention. The surfactant other than the surfactant that is represented by the general formula (2) is not limited. Examples of the surfactant include anionic surfactants manufactured by Kao Corporation such as EMAL® series, LATEMUL® series, VENOL® series, NEOPELEX® series, NS SOAP, KS SOAP, OS SOAP, PELEX® series and the like. Examples of the surfactant also include anionic surfactants manufactured by Lion Corporation such as LIPOLAN® series, LIPON®E series, SUNNOL® series, LIPOTAC® series, ENAGICOL® series, LIPAL® series, LOTAT® series and the like. Furthermore, examples of the surfactant include nonionic surfactants manufactured by Kao Corporation such as EMULGEN® series, RHEODOL® series, EMASOL® series, EXCEL® series, EMANON® series, AMIET® series, AMINON® series and the like. Examples of the surfactant further include nonionic surfactants manufactured by Lion Corporation such as DOBANOX® series, LEOCOL® series, LEOX® series, LAOL®series, LEOCON® series, LIONOL® series, CADENAX® series, LIONON® series, LEOFAT® series and the like. One of the surfactants other than the surfactant that is represented by the general formula (2) may be used alone or two or more of them may be used in combination.

The water-based ink for ink-jet recording may further comprise a conventionally known additive as required. Examples of the additive include a viscosity modifier, a surface tension modifier, and an antifungal agent. Examples of the viscosity modifier include, without limitation, polyvinyl alcohol, cellulose, water-soluble resin and the like.

The water-based ink for ink-jet recording may be prepared, for example, by uniformly mixing the coloring agent, water, the water-soluble organic solvent, and the acetylene glycol surfactant with other added components as required by a conventionally known method, and then removing insolubles with a filter or the like.

As described above, with respect to the water-based ink for ink-jet recording, because the dipropylene glycol propyl ether and the surfactant represented by the general formula (2) are blended so as to satisfy the conditions of (A) and (B), it is good in ejection stability and printing quality as well as preventing compound derived from a rubber member and the like in an ink-jet recording apparatus from being eluted into the ink.

As described above, the water-based ink for ink-jet recording may be used as a water-based magenta ink. Further, the water-based ink for ink-jet recording may be used as a water-based ink other than a magenta color by further comprising coloring agents other than the dye represented by the general formula (1).

An ink cartridge comprises the water-based ink for ink-jet recording. As a body of the ink cartridge, for example, a conventionally known body may be used.

Next, an ink-jet recording apparatus is explained. The ink-jet recording apparatus comprises the ink cartridge and an ink ejection unit, and the water-based ink comprised in the ink cartridge is ejected from the ink ejection unit. Other than this, the ink-jet recording apparatus may have the construction similar to that of a conventionally known ink-jet recording apparatus.

Figure 1:
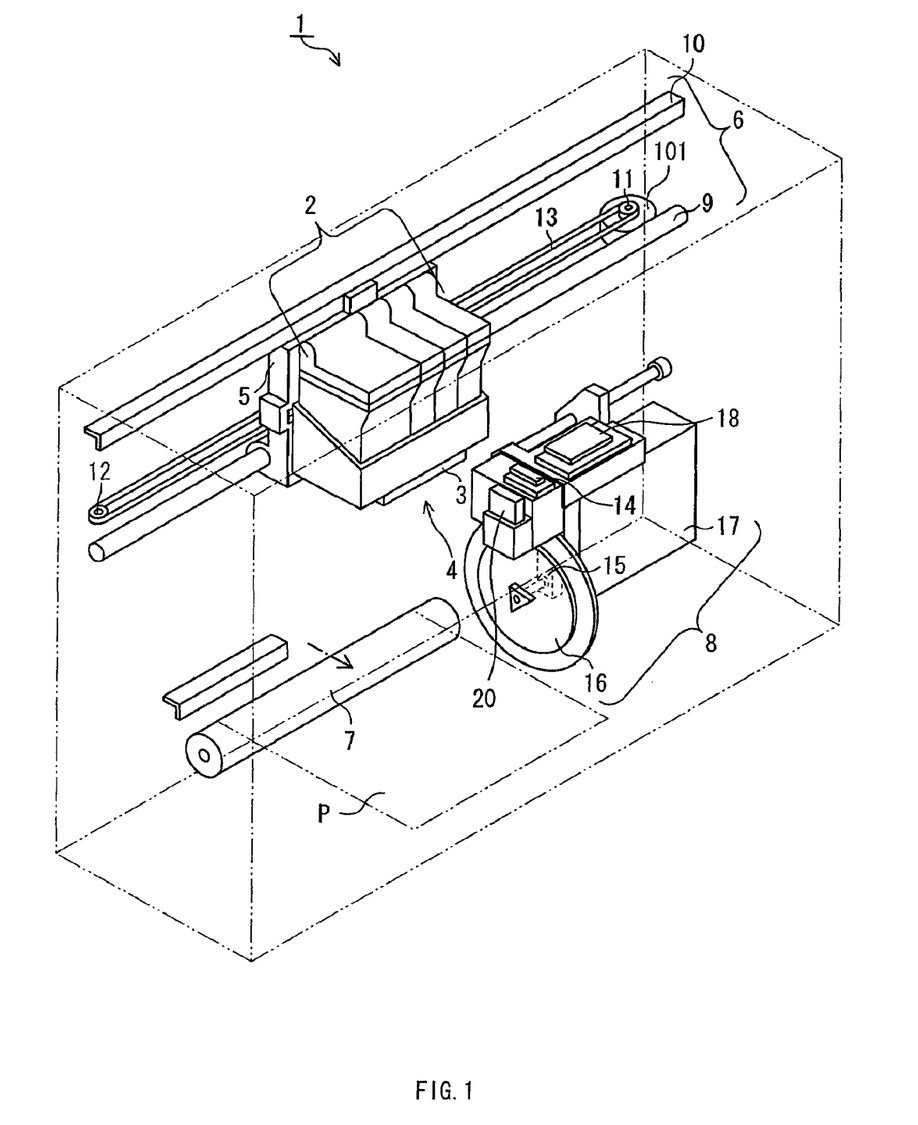
FIG. 1 is a schematic perspective view showing a construction of an example of an ink-jet recording apparatus.

FIG. 1 shows a construction of an example of the ink-jet recording apparatus. As shown in FIG. 1, the ink-jet recording apparatus 1 comprises four ink cartridges 2, an ink-jet head 3, a head unit 4, a carriage 5, a drive unit 6, a platen roller 7, and a purge unit 8 as main constructional elements. In the ink-jet recording apparatus 1 of this example, the ink-jet head 3 is the ink ejection unit.

The four ink cartridges 2 each comprise water-based inks of yellow, magenta, cyan, and black. For example, the water-based magenta ink is the water-based ink for ink-jet recording. The ink-jet head 3 performs printing on a recording material P such as a recording paper. The head unit 4 is provided with the ink-jet head 3. The four ink cartridges 2 and the head unit 4 are mounted to the carriage 5. The drive unit 6 reciprocates the carriage 5 in a straight line. The platen roller 7 extends in a reciprocating direction of the carriage 5 and opposes to the ink-jet head 3.

The drive unit 6 comprises a carriage shaft 9, a guide plate 10, a pair of pulleys 11 and 12, and an endless belt 13. The carriage shaft 9 is disposed at a lower end portion of the carriage 5 and extends in parallel to the platen roller 7. The guide plate 10 is disposed at an upper end portion of the carriage 5 and extends in parallel to the carriage shaft 9. The pulleys 11 and 12 are disposed in positions corresponding to both end portions of the carriage shaft 9 and between the carriage shaft 9 and the guide plate 10. The endless belt 13 is stretched between the pulleys 11 and 12.

In the ink-jet recording apparatus 1, as the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11.

The recording material P is fed from a paper feeding cassette (not shown) positioned on a side of or underneath the ink-jet recording apparatus 1. The recording material P is introduced between the ink-jet head 3 and the platen roller 7. Then, a predetermined printing is performed on the recording material P with the ink ejected from the ink-jet head 3. The recording material P then is discharged from the ink-jet recording apparatus 1. In FIG. 1, a feeding mechanism and a discharging mechanism of the recording material P are not shown.

The purge unit 8 is provided on a side of the platen roller 7. The purge unit 8 is disposed so as to oppose the ink-jet head 3 when the head unit 4 is in a reset position (above the purge unit 8 in this example). The purge unit 8 comprises a purge cap 14, a pump 15, a cam 16, and an ink reservoir 17. The purge cap 14 covers a plurality of nozzles (not shown) of the ink-jet head 3 when the head unit 4 is in a reset position. In this state, the pump 15 draws poor ink comprising, for example, air bubbles trapped inside the ink-jet head 3, by being driven by the cam 16. Thereby a recovery of the ink-jet head 3 is promoted. The drawn poor ink is stored in the ink reservoir 17.

A wiper member 20 is provided on the side of the platen roller 7 in the purge unit 8. The wiper member 20 has a spatula shape, and wipes a nozzle surface of the ink-jet head 3 in accordance with the movement of the carriage 5. In FIG. 1, in order to prevent the ink from drying, a cap 18 covers the plurality of nozzles of the ink-jet head 3 that returns to the reset position after the completion of printing.

With respect to the ink-jet recording apparatus 1 of this example, the four ink cartridges 2 are mounted to one carriage 5. With respect to the ink-jet recording apparatus, the four ink cartridges may be mounted to a plurality of carriages. Further, the four ink cartridges may not be mounted to the carriage, but may be provided and fixed in the ink-jet recording apparatus. In this state, for example, the ink cartridge and the head unit mounted to the carriage are connected via a tube, or the like, and the ink is supplied to the head unit from the ink cartridge.

EXAMPLES

Examples of the present invention are described together with Comparative Examples, which are provided for illustrative purposes only. The present invention is not limited by the following Examples and Comparative Examples.

Examples 1 to 8 and Comparative Examples 1 to 11

An ink composition (Tables 1 to 5) was stirred and then mixed. Thereafter, the mixture was filtered with a hydrophilic polytetrafluoroethylene (PTFE) type membrane filter having a pore diameter of 0.2 µm manufactured by ToyoRoshi Kaisha, Ltd. to produce each water-based ink and thereby obtained the water-based ink of Examples 1 to 8 and Comparative Examples 1 to 11. In the following Tables 1 to 5, the dyes (1-A) to (1-F), are compounds respectively represented by the chemical formulae (1-A) to (1-F).

With respect to the water-based ink of each Example and Comparative Example, (a) printing quality evaluation (bleeding), (b) ejection stability evaluation, (c) ozone resistance evaluation, (d) light resistance evaluation, (e) rubber deposition evaluation, and (f) comprehensive evaluation were carried out with the following method. Further, samples for (c) ozone resistance evaluation and (d) light resistance evaluation were prepared as described below.

First, an ink cartridge was filled up with the water-based ink of each Example and Comparative Example. Next, the ink cartridge was attached to a digital multi-function center DCP-330C, which mounted an ink-jet printer, manufactured by Brother Industries, Ltd. Then, a gradation sample of the ink was printed on a glossy photo paper BP61GLA manufactured by Brother Industries, Ltd, and thereby obtained a patch having an initial Optical Density (OD) value of 1.0. The OD value was measured by a spectrophotometer, Spectrolino, manufactured by Gretag-Macbeth (light source: D65; observer: 2°; and status A).

(a) Printing Quality Evaluation (Bleeding)

Using the digital multi-function center DCP-330C, on an office paper 0411612 manufactured by FUJITSU CoWorCo LIMITED, an evaluation sample was printed with the water-based ink of each Example and Comparative Example for background and with a water-based black ink contained in the ink cartridge LC10BK manufactured by Brother Industries, Ltd. for lines. Rag of border between the aforementioned water-based black ink and the water-based ink of each Example and Comparative Example was measured by a method according to ISO13660. In this state, the Rag is a raggedness of a line defined by ISO13660 and a ragged line indicates a state in which a line is rippled relative to an ideal line edge that supposed to be smooth and straight. From the obtained Rag, an evaluation was carried out according to the following Evaluation Criteria.

Printing Quality Evaluation (Bleeding) Criteria
A: Rag of line is less than 30
B: Rag of line is 30 or more and less than 40
C: Rag of line is 40 or more (b) Ejection Stability Evaluation Using the digital multi-function center DCP-330C, on an office paper 0411612 manufactured by FUJITSU CoWorCo LIMITED, continuous printing of 100 million dots (approximately 30,000 sheets) was carried out. The result of the continuous printing was evaluated in accordance with the following Evaluation Criteria. The term "unejection" denotes the state where the nozzle of the ink-jet head is clogged and the water-based ink is not ejected. The term "ejection deflection" denotes the state where the nozzle of the ink-jet head is partially clogged and thereby the water-based ink is ejected not perpendicularly to the printing paper but obliquely thereto.

Ejection Stability Evaluation Criteria
A: Neither unejection nor ejection deflection occurred during the continuous printing, or slight unejection and/or ejection deflection occurred during the continuous printing but the unejection and/or ejection deflection was restored by five purges or fewer.
C: Unejection and ejection deflection occurred many times during the continuous printing, and the unejection and ejection deflection were not restored by five purges.

(c) Ozone Resistance Evaluation

Using an ozone weather meter, OMS-H, manufactured by SUGA TEST INSTRUMENTS CO., LTD. the gradation sample was left for 40 hours under the following condition. That is, an ozone concentration of 2 ppm, a chamber temperature of 24° C. and a chamber relative humidity of 60%. Next, the OD value of the patch after leave was measured in the same manner as described above. Then, the OD value reduction rate (%) was obtained with the following formula (I) and the ozone resistance was evaluated according to the following Evaluation Criteria. The lower the OD value reduction rate is, the fewer the deterioration of the image, and it can be said that the water-based ink is good in the ozone resistance.

$$\text{OD value reduction rate (\%)} = ((X-Y)/X) \times 100 \qquad (I)$$

X: 1.0 (initial OD value)
Y: OD value after leave
Ozone Resistance Evaluation Criteria
A: OD value reduction rate is less than 20%
C: OD value reduction rate is 20% or more (d) Light Resistance Evaluation Using a high power energy xenon weather meter, SC750-WN, manufactured by SUGA TEST INSTRUMENTS CO., LTD., xenon lamp light was irradiated onto the gradation sample for 200 hours under the following condition. That is, a chamber temperature of 25° C., a chamber relative humidity of 50%, and an illuminance of 93 klx. Next, the OD value of the patch after irradiation was measured in the same manner as described above. Then, the OD value reduction rate (%) was obtained with the following formula (II) and the light resistance was evaluated according to the following Evaluation Criteria. The lower the OD value reduction rate is, the fewer the deterioration of the image, and it can be said that the water-based ink is good in the light resistance.

OD value reduction rate (%)=((X−Y)/X)×100   (II)

X: 1.0 (initial OD value)
Y: OD value after irradiation
Light Resistance Evaluation Criteria
A: OD value reduction rate is less than 30%
C: OD value reduction rate is 30% or more (e) Rubber Deposition Evaluation A rubber piece (ethylene-propylene rubber (EPDM); rubber hardness (measured by old JIS K 6301 A type) 40°) was soaked in 100 g of the water-based ink and stored for a week under an environment of 70° C. in a condition where a contact area of the rubber piece per gram of water-based ink is 30 mm². After storage, the rubber piece was taken out of the water-based ink. Then, the water-based ink in the container was filtered with a hydrophilic polytetrafluoroethylene (PTFE) type membrane filter (with a pore diameter of 0.2 μm and a diamater of 15 mm) manufactured by ToyoRoshi Kaisha, Ltd. Further, the time required for filtration was measured. As a control, 100 g of the water-based ink before storage was filtrated under the same condition and the time required for filtration was measured. Next, an increase rate of filtration time was obtained with the following formula (III) and rubber deposition was evaluated according to the following Evaluation Criteria.

Increase rate of filtration time=Y/X   (III)

Figure 2:
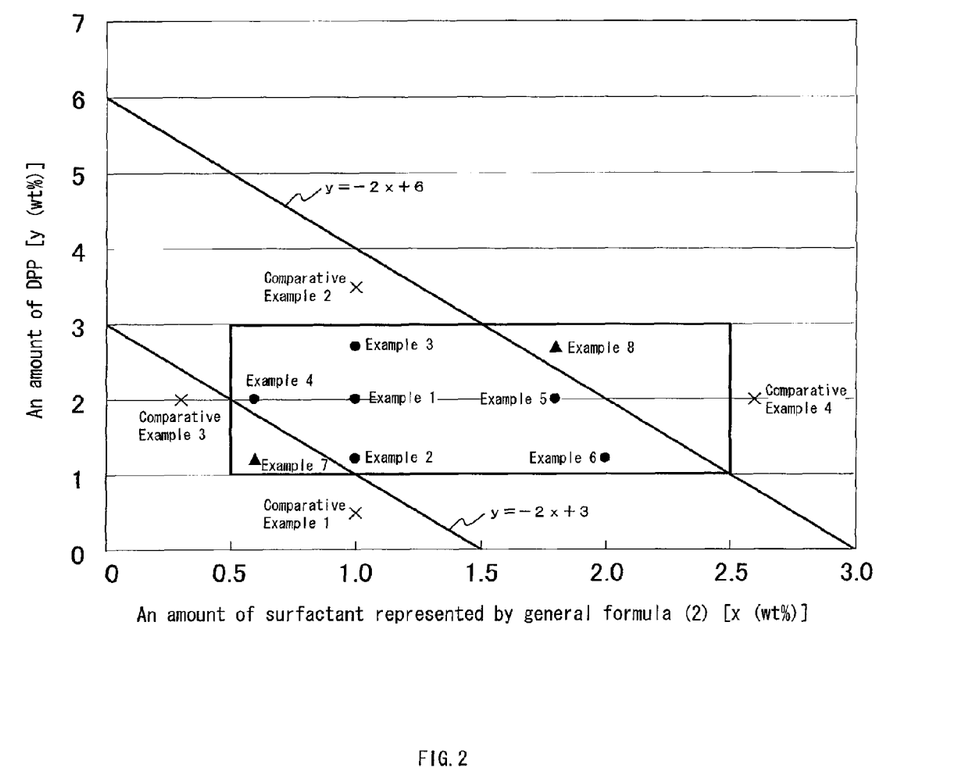
FIG. 2 is a graph indicating a relationship between an amount of surfactant represented by general formula (2) [x (wt %)] and an amount of DPP (dipropylene glycol propyl ether) [y (wt %)] relative to the total amount of ink in Examples 1 to 8 and Comparative Examples 1 to 4.

X: Filtration time before storage
Y: Filtration time after storage
Rubber Deposition Evaluation Criteria
A: Increase rate of filtration time is less than 1.3 times
B: Increase rate of filtration time is 1.3 times or more and less than 1.6 times
C: Increase rate of filtration time is 1.6 times or more (f) Comprehensive Evaluation With respect to the water-based ink of each Example and Comparative Example, from the results of (a) to (e), the comprehensive evaluation was carried out according to the following Evaluation Criteria.
Comprehensive Evaluation Criteria
AA: all evaluation results were "A"
A: "B" was found in one or more of the evaluation results but "C" was not found
C: "C" was found in one or more of the evaluation results Ink compositions and evaluation results of the water-based ink of each Example are summarized in Tables 1 and 2. Further, ink compositions and evaluation results of the water-based ink of each Comparative Example are summarized in Tables 3 to 5. Moreover, a relationship between an amount of the surfactant represented by general formula (2)[x (wt %)] and an amount of the DPP[y (wt %)] relative to the total amount of the ink in Examples 1 to 8 and Comparative Examples 1 to 4 is shown in FIG. 2.

TABLE 1

|  | Example 1 | Example 2 | Example 3 | Example 4 |
|---|---|---|---|---|
| INK COMPOSITION (wt %) |  |  |  |  |
| dye |  |  |  |  |
| dye (1-A) | 3.5 | — | — | — |
| dye (1-B) | — | 4.5 | — | — |
| dye (1-C) | — | — | 2.5 | — |
| dye (1-D) | — | — | — | 2.0 |
| Dipropylene glycol Propyl ether | 2.0 | 1.2 | 2.7 | 2.0 |
| OLFIN ® E1010 (1*) | 1.0 | 1.0 | 1.0 | 0.6 |
| Glycerin | 25.0 | 25.0 | 25.0 | 25.0 |
| Water | Balance | Balance | Balance | Balance |
| EVALUATION |  |  |  |  |
| Printing Quality Evaluation | A | A | A | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | A |
| Comprehensive Evaluation | AA | AA | AA | AA |

(1*) surfactant represented by general formula (2) (ethylene oxide (10 mol) additive of acethylene diol) manufactured by Nissin Chemical Industry Co., Ltd

TABLE 2

|  | Example 5 | Example 6 | Example 7 | Example 8 |
|---|---|---|---|---|
| INK COMPOSITION (wt %) |  |  |  |  |
| dye |  |  |  |  |
| dye (1-B) | — | — | 3.5 | — |
| dye (1-C) | — | — | — | 4.5 |
| dye (1-E) | 4.0 | — | — | — |
| dye (1-F) | — | 3.0 | — | — |
| Dipropylene glycol Propyl ether | 2.0 | 1.2 | 1.2 | 2.7 |
| OLFIN ® E1010 (1*) | 1.8 | 2.0 | 0.6 | 1.8 |
| Glycerin | 25.0 | 25.0 | 25.0 | 25.0 |
| Water | Balance | Balance | Balance | Balance |
| EVALUATION |  |  |  |  |
| Printing Quality Evaluation | A | A | B | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | B |
| Comprehensive Evaluation | AA | AA | A | A |

(1*) surfactant represented by general formula (2) (ethylene oxide (10 mol) additive of acethylene diol) manufactured by Nissin Chemical Industry Co., Ltd

TABLE 3

|  | Comparative Example 1 | Comparative Example 2 | Comparative Example 3 | Comparative Example 4 |
|---|---|---|---|---|
| INK COMPOSITION (wt %) |  |  |  |  |
| dye |  |  |  |  |
| dye (1-A) | 4.0 | — | — | — |
| dye (1-B) | — | 3.0 | — | — |
| dye (1-C) | — | — | 3.5 | — |
| dye (1-D) | — | — | — | 4.5 |
| Dipropylene glycol propyl ether | 0.5 | 3.5 | 2.0 | 2.0 |
| OLFIN ® E1010 (1*) | 1.0 | 1.0 | 0.3 | 2.6 |

TABLE 3-continued

|  | Comparative Example 1 | Comparative Example 2 | Comparative Example 3 | Comparative Example 4 |
|---|---|---|---|---|
| Glycerin | 25.0 | 25.0 | 25.0 | 25.0 |
| Water | Balance | Balance | Balance | Balance |
| EVALUATION |  |  |  |  |
| Printing Quality Evaluation | C | A | C | A |
| Ejection Stability Evaluation | A | C | A | A |
| Ozone Resistance Evaluation | A | A | A | A |
| Light Resistance Evaluation | A | A | A | A |
| Rubber Deposition Evaluation | A | A | A | C |
| Comprehensive Evaluation | C | C | C | C |

(1*) surfactant represented by general formula (2) (ethylene oxide (10 mol) additive of acethylene diol) manufactured by Nissin Chemical Industry Co., Ltd

TABLE 4

|  | Comparative Example 5 | Comparative Example 6 | Comparative Example 7 | Comparative Example 8 |
|---|---|---|---|---|
| INK COMPOSITION (wt %) |  |  |  |  |
| Dye |  |  |  |  |
| dye (1-A) | — | 2.0 | — | — |
| dye (1-B) | — | — | 4.0 | — |
| dye (1-E) | 2.5 | — | — | — |
| C.I. Acid Red 14 | — | — | — | 3.5 |
| Dipropylene glycol propyl ether | — | — | — | 0.5 |
| Dipropylene glycol methyl ether | 2.0 | — | — | — |
| Dipropylene glycol butyl ether | — | 2.0 | — | — |
| Propylene glycol propyl ether | — | — | 2.0 | — |
| OLFIN® E1010 (1*) | 1.0 | 1.0 | 1.0 | — |
| Glycerin | 25.0 | 25.0 | 25.0 | 25.0 |
| Water | Balance | Balance | Balance | Balance |
| EVALUATION |  |  |  |  |
| Printing Quality Evaluation | C | A | A | C |
| Ejection Stability Evaluation | A | A | A | C |
| Ozone Resistance Evaluation | A | A | A | C |
| Light Resistance Evaluation | A | A | A | C |
| Rubber Deposition Evaluation | A | C | C | A |
| Comprehensive Evaluation | C | C | C | C |

(1*) surfactant represented by general formula (2) (ethylene oxide (10 mol) additive of acethylene diol) manufactured by Nissin Chemical Industry Co., Ltd

TABLE 5

|  | Comparative Example 9 | Comparative Example 10 | Comparative Example 11 |
|---|---|---|---|
| INK COMPOSITION (wt %) |  |  |  |
| dye |  |  |  |
| C.I. Acid Red 14 | — | 3.5 | — |
| C.I. Direct Red 227 | 3.0 | — | 3.0 |
| Dipropylene glycol propyl ether | 0.5 | 0.5 | 0.5 |
| OLFIN® E1010 (1*) | — | 0.5 | 0.5 |
| Glycerin | 25.0 | 25.0 | 25.0 |
| Water | Balance | Balance | Balance |
| EVALUATION |  |  |  |
| Printing Quality Evaluation | C | A | A |
| Ejection Stability Evaluation | C | A | A |
| Ozone Resistance Evaluation | C | C | C |
| Light Resistance Evaluation | C | C | C |
| Rubber Deposition Evaluation | A | A | A |
| Comprehensive Evaluation | C | C | C |

(1*) surfactant represented by general formula (2) (ethylene oxide (10 mol) additive of acethylene diol) manufactured by Nissin Chemical Industry Co., Ltd As summarized in Tables 1 and 2, each water-based ink of Examples 1 to 6 was good in all results of the printing quality evaluation (bleeding), the ejection stability evaluation, the ozone resistance evaluation, the light resistance evaluation, and the rubber deposition evaluation. The water-based ink of Example 7 that satisfies $y<-2x+3$ was slightly inferior in the result of the printing quality evaluation (bleeding), however was a reasonable level in practical use. Further, the water-based ink of Example 8 that satisfies $y>-2x+6$ was slightly inferior in the result of the rubber deposition evaluation, however was a reasonable level in practical use. In contrast, as summarized in Tables 3 to 5, the water-based ink of Comparative Example 1 that satisfies $y<1$ was inferior in the result of the printing quality evaluation (bleeding). The water-based ink of Comparative Example 2 that satisfies $y>3$ was inferior in the result of the ejection stability evaluation. The water-based ink of Comparative Example 3 that satisfies $x<0.5$ was inferior in the result of the printing quality evaluation (bleeding). The water-based ink of Comparative Example 4 that satisfies $x>2.5$ was inferior in the result of the rubber deposition evaluation. The water-based ink of Comparative Example 5 that does not comprise DPP was inferior in the result of the printing quality evaluation (bleeding) due to dipropylene glycol methyl ether added to the ink instead of the DPP. Each water-based ink of Comparative Examples 6 and 7 that does not comprise DPP was inferior in the result of the rubber deposition evaluation due to dipropylene glycol butyl ether or propylene glycol propyl ether added to the ink instead of the DPP. Each water-based ink of Comparative Examples 8 and 9 that does not comprise the dye represented by the general formula (1) and the surfactant represented by the general formula (2) was inferior in the results of the printing quality evaluation (bleeding), the ejection stability evaluation, the ozone resistance evaluation, and the light resistance evaluation. Each water-based ink of Comparative Examples 10 and 11 that does not comprise the dye represented by the general formula (1) was inferior in the results of the ozone resistance evaluation and the light resistance evaluation.

It will be obvious to those having skill in the art that many changes may be made in the above-described details of the particular aspects described herein without departing from the spirit or scope of the invention as defined in the appended claims.

What is claimed is:

1. A water-based ink for ink-jet recording comprising a coloring agent, water, a water-soluble organic solvent, and an acetylene glycol surfactant, wherein the coloring agent comprises a dye represented by the following generic formula (1), the water-soluble organic solvent comprises dipropylene glycol propyl ether, the acetylene glycol surfactant comprises a surfactant represented by the following general formula (2), and wherein the dipropylene glycol propyl ether, and the surfactant represented by the following general formula (2) are blended so as to satisfy the following conditions (A) and (B), respectively:

(A) an amount of surfactant represented by general formula (2) relative to a total amount of the ink is in the range of 0.5 wt % to about 2.5 wt %

(B) an amount of dipropylene glycol propyl ether relative to a total amount of the ink is in the range of about 1 wt % to about 3 wt %

(1)

wherein in the general formula (1),

$R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$, and $R_7$, each independently, represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, provided that $R_4$, $R_5$, $R_6$, and $R_7$ may be the same or different, that $R_4$ and $R_5$ are not simultaneously hydrogen atoms, and that $R_6$ and $R_7$ are not simultaneously hydrogen atoms; and $A_1$ and $A_2$ are both substituted or unsubstituted carbon atoms, or one of $A_1$ and $A_2$ is a substituted or unsubstituted carbon atom and the other is a nitrogen atom:

(2)

wherein in the general formula (2), m and n may be the same or different and indicate numbers that satisfy $m + n = 1$ to 15; and $R_{11}$, $R_{12}$, $R_{13}$, and $R_{14}$ may be the same or different and are straight chain or branched-chain alkyl groups having 1 to 5 carbon atoms.

2. The water-based ink according to claim 1, wherein the dipropylene glycol propyl ether and the surfactant represented by the general formula (2) are blended so as to satisfy the following condition (C), respectively:

$$y \geq -2x + 3 \text{ and } y \leq -2x + 6 \tag{C}$$

x: an amount of surfactant represented by general formula (2) relative to a total amount of the ink (wt %)

y: an amount of dipropylene glycol propyl ether relative to a total amount of the ink (wt %).

3. The water-based ink according to claim 1, wherein an amount of the dye represented by the general formula (1) relative to a total amount of the ink is in a range of about 2 wt % to about 4.5 wt %.

4. The water-based ink according to claim 1, wherein the ink is water-based magenta ink.

5. The water-based ink according to claim 1, wherein the dye represented by the general formula (1) comprises at least one compound selected from the group consisting of compounds represented by the following chemical formulae (1-A) to (1-F):

(1-A)

(1-B)

(1-C)

(1-D)

(1-E)

(1-F)

6. An ink cartridge comprising a water-based ink according to claim 1.

7. An ink-jet recording apparatus comprising an ink cartridge according to claim 6 and an ink ejection unit, wherein a water-based ink comprised in the ink cartridge is ejected from the ink ejection unit.

* * * * *